United States Patent [19]

Pamer et al.

[11] Patent Number: 4,708,556
[45] Date of Patent: Nov. 24, 1987

[54] FASTENER ATTACHED TO SHEET METAL

[75] Inventors: W. Richard Pamer; James A. Zils, both of Parma, Ohio

[73] Assignee: Russell, Burdsall & Ward Corporation, Brooklyn Heights, Ohio

[21] Appl. No.: 733,978

[22] Filed: May 14, 1985

[51] Int. Cl.⁴ .............................................. F16B 37/04
[52] U.S. Cl. .................... 411/179; 411/180; 411/187
[58] Field of Search ............... 411/181, 174, 176, 177, 411/179, 180, 187, 188, 81, 107, 166

[56] References Cited

U.S. PATENT DOCUMENTS

| | | |
|---|---|---|
| Re. 27,143 | 6/1971 | Breed et al. |
| 2,985,213 | 5/1961 | Consandine . |
| 3,253,631 | 5/1966 | Reusser ........................... 411/179 |
| 3,270,355 | 9/1966 | Tildesley ...................... 411/176 X |
| 3,489,312 | 1/1970 | Hunckler ....................... 411/34 X |
| 3,754,677 | 8/1973 | Hug ............................... 411/119 X |
| 3,800,914 | 4/1974 | Miyata .......................... 210/222 X |
| 3,878,599 | 4/1975 | Ladouceur ................... 411/179 X |
| 3,916,725 | 11/1975 | Reber ............................. 74/606 R |
| 4,018,257 | 4/1977 | Jack . |
| 4,389,766 | 6/1983 | Capuano ...................... 411/179 X |
| 4,432,681 | 2/1984 | Capuano ...................... 411/180 |
| 4,468,161 | 8/1984 | Krueger ........................ 411/171 |

FOREIGN PATENT DOCUMENTS

| | | |
|---|---|---|
| 498850 | 9/1975 | Australia . |
| 1312056 | 11/1961 | France . |
| 1515001 | 9/1966 | France . |

Primary Examiner—Neill Wilson
Attorney, Agent, or Firm—Tarolli, Sundheim & Covell

[57] ABSTRACT

An improved fastener includes a shank section which is coaxial with and extends outwardly from a head section. The head section has a rim which cooperates with the shank section to form a groove in which sheet metal is received. The head and shank sections have arcuate indentations into which the sheet metal is forced. In addition, the shank section has arcuate outer side surfaces which oppose flat outer side surfaces on the rim. Due to the difference in the configurations of the side surfaces of the rim and shank sections, constrictions are formed between the rim and shank sections. Each constriction tends to deform or extrude sheet metal upon the application of torque to the fastener. The corners of the indentations in the shank sections and the rim apply shear forces to the sheet metal to further resist relative rotation between the fastener and the sheet metal. The indentations in the rim of the fastener have sloping side surfaces to promote a smooth flow of the sheet metal into the groove upon mounting of the fastener in the sheet metal.

10 Claims, 6 Drawing Figures

FASTENER ATTACHED TO SHEET METAL

BACKGROUND OF THE INVENTION

An improved fastener is received in a member and held against axial and rotational movement relative to the member by an interaction between the member and the fastener.

A fastener which is held against axial and rotational movement relative to a sheet metal member by an interaction between the member and the fastener is disclosed in U.S. Pat. No. 4,389,766. The fastener disclosed in this patent has a shank section which extends axially outwardly from a head section and has a central axis which is coincident with the central axis of the head section. The shank section and rim of this fastener have side surfaces which cooperate to define a generally annular groove.

The side surfaces of the groove have a common center of curvature. Therefore, the distance between the side surfaces of the groove remains constant in a circumferential direction around the shank of the fastener. Since the distance between the side surfaces remains constant, the side surfaces cannot cooperate to resist relative rotation between the fastener and a sheet metal member.

The fastener of U.S. Pat. No. 4,389,766 is provided with relatively deep circular indentations in the rim of the fastener. Due to depth of the circular indentations, the sheet metal does not flow smoothly into the indentations in the rim of the fastener. Therefore, wrinkles tend to form in the sheet metal where the sheet metal goes into the indentations in the rim of the fastener.

SUMMARY OF THE PRESENT INVENTION

The present invention provides a new and improved fastener which is held against axial and rotational movement relative to a member by the interaction between the member and the fastener. The fastener has a shank section which extends axially outward from and is coaxial with a head section of the fastener. The head section includes a rim which cooperates with the shank section to define a groove in which the material of the member is received. In order to prevent rotational movement of the fastener relative to the member upon the application of torque loads to the fastener, indentations are formed in the rim and shank section of the fastener. These indentations have corners which apply shear or torsional forces to the material of the member.

To further resist relative rotation between the member and the fastener, side surfaces on the shank section and the rim of the fastener cooperate to form constrictions. Upon the application of a torque load to the fastener, the constrictions apply deformation forces to the material of the member to resist relative rotation between the fastener and the member. Thus, the fastener is held against rotation relative to the member by the combined influence of shear forces and deformation forces.

The indentations in the rim of the fastener are advantageously formed with radially and axially outwardly sloping side surfaces. The sloping side surfaces of the indentations promote a smooth flow of the material of the member into the indentations during mounting of the fastener. This results in the member having a relatively smooth surface on the side opposite where the fastener is mounted on the member. Due to the smooth surface, the fastener may advantageously be used as a drain nut in an oil pan. The smooth surface in the area where the drain nut is mounted promotes the formation of a tight seal with a drain plug.

Accordingly, it is an object of this invention to provide a new and improved fastener which is adapted to be received in a member and held against axial and rotational movement relative to the member by an interaction between the member and the fastener and wherein relative rotation between the fastener and member is resisted under the combined influence of (1) deformation forces applied to the material of the member by side surfaces on a shank section and rim of the fastener and (2) shear forces applied to the material of the member by the corners of indentations in the rim and shank section.

Another object of this invention is to provide a new and improved fastener as set forth in in the preceeding object and wherein the indentations in the rim of the fastener have sloping side surfaces to promote a smooth flow of the material of the member into a groove between the shank section and rim of the fastener upon mounting of the fastener on the member.

Another object of this invention is to provide a new and improved oil pan for holding a body of oil used to lubricate an internal combustion engine and wherein the oil pan has a drain nut with indentations which have sloping side surfaces to promote a smooth flow of metal into the indentations to thereby facilitate the formation of a fluid tight seal between the oil pan and threaded drain plug upon tightening of a drain plug into the drain nut.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENT OF THE INVENTION

General Description

Figure 1:
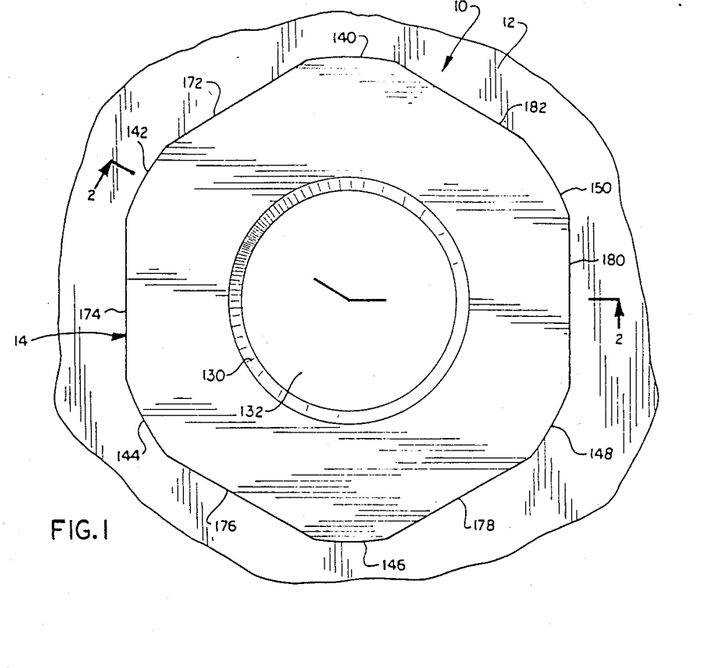
FIG. 1 is a top plan view illustrating the relationship of a fastener constructed in accordance with the present invention to a sheet metal member in which the fastener is mounted.
Figure 2:
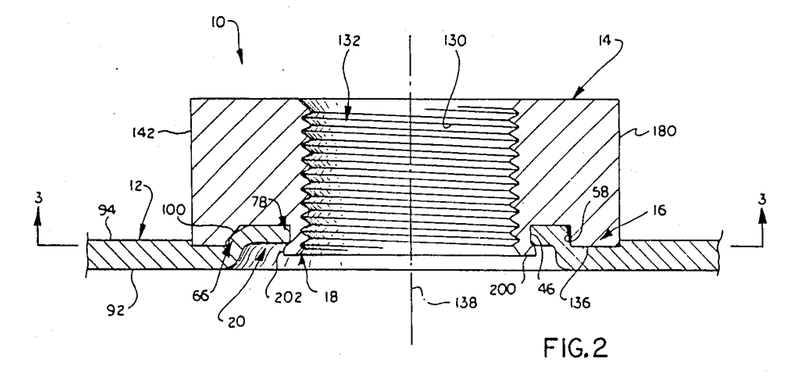
FIG. 2 is a sectional view, taken generally along the line 2—2 of FIG. 1, illustrating the manner in which the sheet metal member is forced into a groove formed between a shank section of the fastener and a rim on a head section of the fastener.
Figure 3:
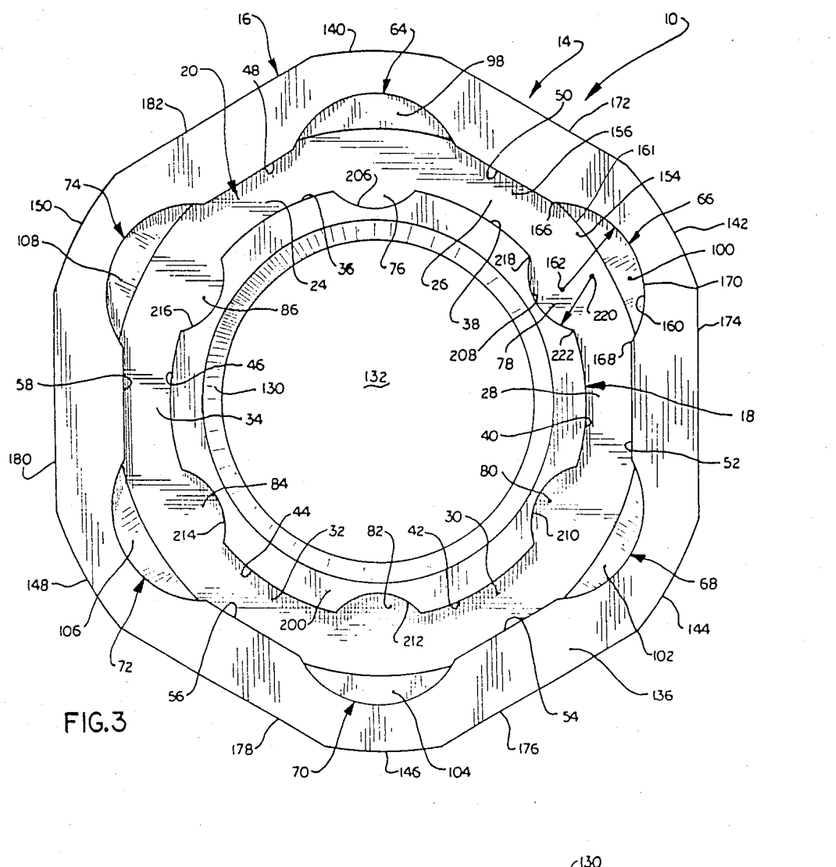
FIG. 3 is an enlarged bottom plan view, taken generally along the line 3—3 of FIG. 2, and illustrating the relationship between the rim and shank section of the fastener.

An internally threaded fastener 10 (FIGS. 1 and 2) constructed in accordance with the present invention is received in a sheet metal member 12 and is held against axial and rotational movement by the interaction between the sheet metal and the fastener. The fastener has a hexagonal head section 14 (FIG. 1) with an axially extending rim 16 (FIG. 2). The rim 16 cooperates with an axially extending shank section 18 to form a generally annular groove 20 (FIG. 3). The material of the sheet metal member 12 is forced into the groove 20 by a suitable die during mounting of the fastener 10 on the sheet metal member (FIG. 2).

In accordance with a feature of the present invention, the fastener 10 and sheet metal member 12 cooperate to hold the fastener against rotation under the combined influence of deformation and shear forces. The deformation forces are applied to the sheet metal member 12 at constrictions 24, 26, 28, 30, 32 and 34 (FIG. 3) formed between the shank section 18 and rim 16 of the fastener 10. To form the constrictions 24–34, the shank section 18 is provided with arcuate outer side surfaces 36, 38, 40, 42, 44 and 46 and the rim 16 is provided with flat side surfaces 48, 50, 52, 54, 56 and 58. Upon the application of torque to the fastener 10, the arcuate side surfaces 36–46 on the shank section 18 and flat side surfaces 48–58 on the rim 16 tend to compress or extrude the sheet metal with a funnel effect to apply deformation or cold working forces to the sheet metal.

Shear forces are also applied to the sheet metal 12 upon the application of torque to the fastener 10. The shear forces result from a tendency to shear the sheet metal 12 at indentations in the rim 16 and shank section 18 of the fastener. Thus, radially outwardly projecting indentations 64, 66, 68, 70, 72 and 74 are formed in the rim 16 of the fastener. Radially inwardly projecting indentations 76, 78, 80, 82, 84 and 86 are formed in the shank section 18. The material of the sheet metal member 12 extends into the indentations 64–86 and tends to be sheared off upon the application of torque to the fastener 10 to apply shear forces to the sheet metal.

The fastener 10 cooperates with the sheet metal 12 to have a smooth side surface 92 (FIG. 2) on a side of the sheet metal opposite from the side 94 upon which the fastener 10 is mounted (FIG. 2). To promote a smooth flow of the sheet metal into the groove 20 and particularly into the indentations 64–74 in the rim 16, the rim indentations are provided with radially and axially outwardly sloping side surfaces 98, 100, 102, 104, 106 and 108 (FIG. 3). The sloping side surfaces 98–108 of the rim indentations 64–74 result in a smooth flow of the sheet metal 12 into the rim indentations 64–74 when the fastener 10 is mounted on the sheet metal 12.

Figure 6:
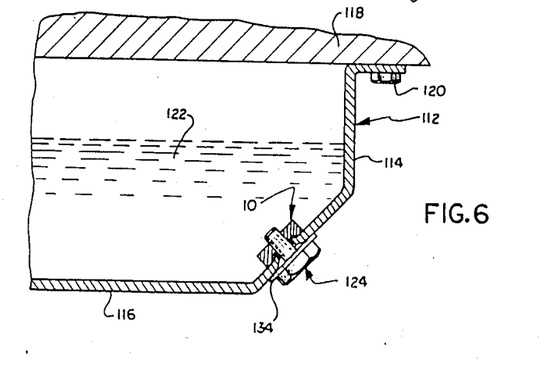
FIG. 6 is a fragmentary sectional view illustrating the manner in which the fastener of FIGS. 1-5 may be used as an oil pan drain nut.

Due to the fact that the sheet metal 12 has a smooth side surface 92 on the side of the sheet metal opposite from the fastener 10, the fastener 10 can advantageously be used as a drain nut for an oil pan 112 (FIG. 6). The oil pan 112 includes a plurality of side walls 114 which are connected with a bottom wall 116 (FIG. 6). The oil pan 112 is connected with an engine block 118 by suitable fasteners 120. The drain nut 10 is mounted on the inside of the oil pan in the same manner as previously described in conjunction with the sheet metal 12.

When the oil 112 is to be replaced, a drain plug 124 is unscrewed from an internal thread convolution 130 (see FIGS. 1 and 2) formed on the inner side wall of an axially extending opening 132 through the fastener 10. The opening 132 is coincident with the central axis of the fastener and with the central axes of the head section 14 and shank section 18 as well as with the central axis of the generally annular groove 20. When the drain plug 124 (see FIG. 6) is removed, the oil 122 drains from the oil pan 112 in a known manner.

Once the oil 122 is drained from the oil pan 112, the drain plug 124 is again screwed into the drain nut 10. Since the outer surface of the side wall 114 opposite from the drain nut 10 is smooth, a fluid tight seal can readily be obtained between the drain plug 124 and side wall 114 of the oil pan. If desired, a washer 134 of a suitable polymeric material may be provided between the drain plug 124 and the side wall 114 of the oil pan 112.

Although the fastener 10 is advantageously used as an oil pan drain plug, the fastener can be used in other environments if desired. It is contemplated that the fastener 10 will be particularly satisfactory in environments where repeated torque loads are applied to the fastener and/or where the sheet metal on the side opposite from the fastener must be smooth. It is contemplated that the smooth side surface of the sheet metal opposite from the fastener will be particularly advantageous when a seal is to be established against this surface.

Head Section

The head section 14 includes the generally hexagonal rim 16 which extends axially along the shank 18 (see FIG. 2) to form the generally annular groove 20 (FIG. 3). The axially outer end of the rim 16 has a flat bearing surface 136 (FIGS. 2 and 3) which abuttingly engages the side surface 94 of the sheet metal 12. The bearing surface 136 extends perpendicular to the central axis 138 of the fastener 10. When the fastener is mounted on the sheet metal 12, the bearing surface 136 indents the sheet metal slightly.

During mounting of the fastener 10, at least a major portion of each of the rim indentations 64–74 is filled with the sheet metal 12. The identical indentations 64–74 in the rim 16 are radially aligned with rounded corners 140, 142, 144, 146, 148 and 150 on the head section 14 (FIGS. 1 and 3). Although the fastener 10 has been shown with rounded corners 140–150, the fastener could have sharp corners if desired.

Figure 4:
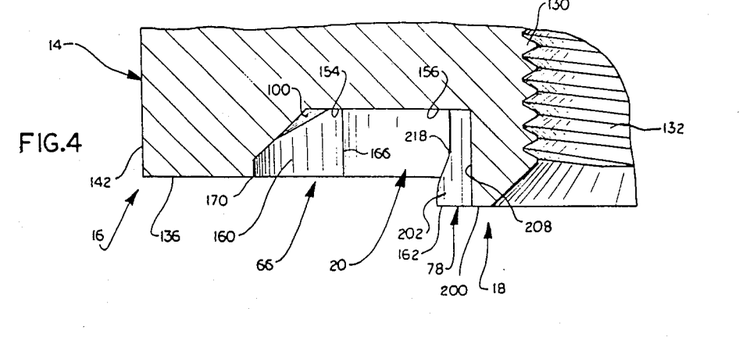
FIG. 4 is an enlarged fragmentary illustration of a portion of the fastener of FIG. 2 and illustrating the relationship between an indentation formed in the rim of the fastener and an indentation formed in the shank section of the fastener.
Figure 5:
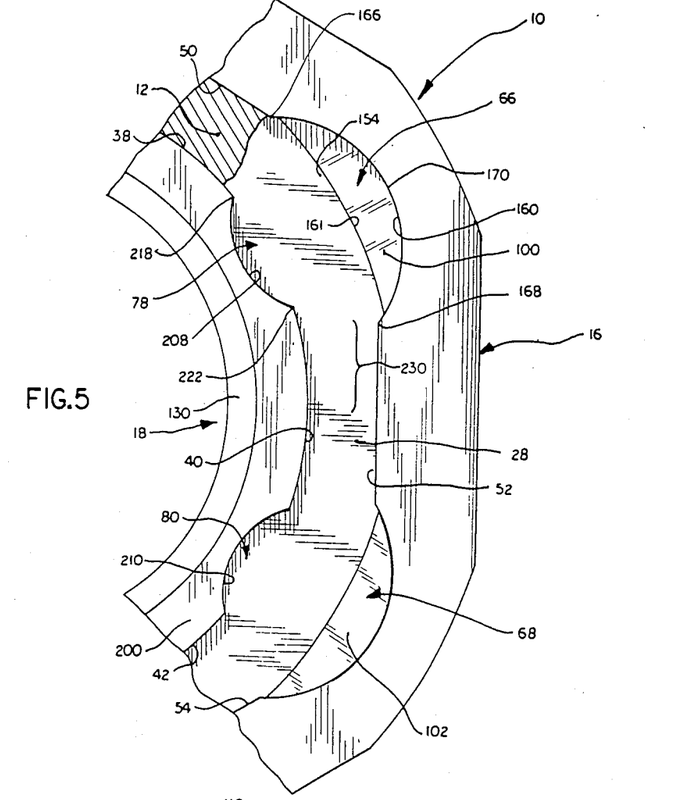
FIG. 5 is an enlarged fragmentary bottom plan view illustrating the manner in which a constriction is formed between a flat side surface on the rim and an arcuate side surface on the shank section to deform sheet metal upon relative rotation between the fastener and the sheet metal.

The indentation 66 in the rim 16 has a flat bottom surface 154 (FIG. 4) which is formed as a continuation of a flat and annular bottom surface 156 of the groove 20 (FIG. 5). The flat bottom surface 156 of the groove 20 extends parallel to the bearing surface 136 and perpendicular to the axis 138.

The sloping side surface 100 (FIG. 3) of the indentation 66 extends radially and axially outwardly from the bottom surface 154 of the indentation 66 to an arcuate side surface 160. The sloping side surface 100 has an arcuate line 161 (FIGS. 3 and 5) of intersection with the radially extending bottom surface 154. The center of curvature of the arcuate line 161 of intersection between the side and bottom surfaces 100 and 154 is disposed on the central axis 138 of the fastener 10. The arcuate side surface 160 intersects the bearing surface 136 at an arcuate corner 170 (FIG. 4).

The arcuate side surface 160 forms an arc of a circle having a center 162 (FIG. 3) which is located radially inwardly or the circular central axis of the groove 20. The arcuate side surface 160 extends axially outwardly from an arcuate line of intersection with the radially and axially outwardly sloping surface 100. The arcuate side surface 160 also extends axially outwardly from the bottom surface 154 of the recess 66. This results in the formation of a pair of axially extending corners 166 and 168 at the line of intersection of the arcuate side surface 160 with the flat side surfaces 50 and 52 (FIG. 3). The arcuate side surface 160 intersects the bearing surface 136 at an arcuate corner 170. Thus, at radially inner portions of the recess 66, the arcuate side surface 160 extends axially outwardly from the flat bottom surface 154 to the bearing surface 136. In the central portion of the recess 66, the arcuate side surface 160 extends axially outwardly from the sloping side surface 100 to the bearing surface 136.

The corners 166 and 168 have an axial depth equal to the depth of the groove 20 (FIGS. 3 and 4). Thus, the corners 166 and 168 extend between the flat bottom surface 156 of the groove 20 and the flat bearing surface 136. The arcuate side surface 160 extends axially in a direction parallel to the central axis 138 (FIG. 2) of the fastener 10. The center of curvature 162 of the surface 160 is disposed on a radial plane extending between the central axis 138 of the fastener 10 through the center of the corner 142. Although only the indentation 66 has been extensively described herein, it should be understood that the other rim indentations 64, 68, 70, 72 and 74 have the same configuration as the indentation 66 and are radially aligned with the associated corners 140, 144, 146, 148 and 150 of the rim 16.

The flat axially extending rim side surfaces 48–58 extend from the flat bottom surface 156 of the groove 20 to the flat bearing surface 136. The flat side surfaces 48–58 extend parallel to the fastener axis 138 (FIG. 2) and to the outer side surfaces 172, 174, 176, 178, 180 and 182 of the head section 14 (see FIGS. 1 and 3). The flat side surfaces 48–58 have a width, as measured perpendicular to the central axis 138, which is equal to the chordal distance between the corners 166, 168 of the indentations 64–74. Thus, as viewed in FIG. 3, the distance from the corner 166 of the indentation 66 to the adjacent corner of the indentation 64 is approximately equal to the distance between the corners 166 and 168 of the indentation 66.

By forming the indentations 64–74 with a relatively large radius of curvature and by providing the indentations with the sloping side surfaces 98–108, there is a relatively smooth flow of metal into the indentations 64–74 and groove 20. This is accomplished with little or no tendency for the sheet metal 12 to wrinkle as the sheet metal is forced into the indentations 64–74 and groove 20. If the indentations 64–74 had a smaller radius of curvature, the sheet metal would tend to gather or wrinkle at the indentations. Similarly, if the sloping side surfaces 98–108 of the indentations 64–74 were eliminated, the resulting sharp bend in the sheet metal would tend to cause it to bunch up and wrinkle.

Shank Section

The shank section 18 is coaxial with the rim 16. The shank section 18 has an annular end surface 200 (FIGS. 2 and 3) which cuts an opening in the sheet metal 12 during mounting of the fastener. The shank section 18 also has an annular bulge 202 (FIGS. 2 and 4) which engages the sheet metal 12 to hold the fastener 10 against being pushed axially out of the opening in the sheet metal. Thus, the sheet metal 12 is forced axially inwardly past the bulge into firm abutting engagement with the shank section 18 by a suitable die as the fastener 10 is mounted on the sheet metal. The sheet metal 12 fills at least a major portion of each of the shank indentations 76–86 (FIGS. 2 and 3).

The arcuate indentations 76–86 in the shank section 18 are radially aligned with the indentations 64–74 in the rim 16. The indentations 76–86 extend throughout the axial extent of the shank section 18 and therefore have a greater length than the indentations 64–74 in the rim section 16. Thus, the flat bottom surface 156 of the groove 20 extends radially inwardly into each of the indentations 76–86 to form axially inner end surfaces of the indentations. The indentations 76–86 are open at their axially outer ends (see FIGS. 3 and 4) so that the sheet metal 12 enters the indentations 76–86 as the shank section 18 of the fastener 10 pierces an opening through the sheet metal during mounting of the fastener on the sheet metal.

Each of the identical indentations 76–86 has an axially extending arcuate side surface 206, 208, 210, 212, 214 and 216 (FIG. 3). The arcuate side surfaces 206–216 extend axially throughout the length of the shank section 18 and have equal radii with centers of curvature which are disposed radially outwardly of the circular central axis of the groove 20. Thus, the center of curvature for the arcuate side surface 208 of the shank indentation 78 is along an axis 220. The axis 220 extends parallel to the central axis 138 (FIG. 2) of the fastener 10 and to the central axis 162 of the side surface 160 of the rim indentation 66.

The center of curvature of the shank indentation surface 208 is on the same radial plane as the center of curvature 162 of the arcuate side surface 160 of the rim indentation 66. However, the radius of curvature for the side surface 208 of the shank indentation 78 is approximately two thirds of the radius of curvature for the side surface 160 of the rim indentation 66. The arcuate side surface 208 of the indentation 78 extends parallel to the central axis 138 of the fastener. Due to the bulge 202 at the axially outer end portion of the shank 18, the axially outer end portion of the recess 78 has a greater depth than the axially inner end portion of the recess (FIG. 4).

The arcuate side surfaces 38 and 40 of the shank section 18 intersect the indentation surface 208 at corners 218 and 222. The straight axially inner portions of the corners 218 and 222 extend parallel to the central axis 138 and to the rim corners 166 and 168. The corners 218 and 222 apply shear forces to the sheet metal 12 upon the application of torque loads to the fastener 10.

The arcuate outer side surfaces 36–46 of the shank section 18 extend axially along the shank section from the flat bottom surface 156 of the groove 20 to the generally circular outer end surface 200 of the fastener. However, the diameter of the arcuate outer side surfaces 36–46 increases at the bulge 202 in the outer end portion of the shank section 18. The center of curvature for each of the side surfaces 36–46 is disposed on the central axis 138. The axially inner portions of the side surfaces 36–46 extend parallel to the central axis 138. However, the side surfaces 36–46 curve away from central portions of the flat rim surfaces 48–58 to form the converging-diverging constrictions 24–34 (FIG. 3).

Although the foregoing description is primarily in regard to the shank indentation 78, it should be understood that the other shank indentations 76, 80, 82, 84 and 86 have the same construction as the shank indentation 78. It should also be understood that the shank indentations 76, 80, 82, 84 and 86 cooperate with the sheet metal 12 to apply shear forces to the sheet metal upon the application of torque to the fastener 10.

Rotation Resistance

The fastener 10 resists rotation relative to the sheet metal 12 under the combined influence of deformation or cold working forces applied to the sheet metal at the constrictions 24–34 and shear forces applied to the sheet metal at the corners of the rim indentations 64–74 and shank indentations 76–86. Thus, upon application of a torque to the fastener 10 tending to rotate it in a counterclockwise direction (as viewed in FIG. 5), the flat side surface 52 of the rim and the arcuate side surface 40 on the shank section 18 apply deformation forces to the portion of the sheet metal in the area indicated at 230 in FIG. 5. These deformation or cold working forces tend to extrude the sheet metal 12 as the sheet metal tends to be forced into the constriction 28. The extrusion effect results from the decrease of the distance between the curving side surface 40 of the shank section 18 and flat side surface 52 of the rim. Since the arcuate shank surface 40 and flat rim surface 52 have a substantial circumferential extent along the groove 20, these cold working forces are applied to a substantial area of the sheet metal 12. Of course, the deformation forces are applied to portions of the sheet metal 12 at each of the constrictions 24–34 in the same manner as previously explained ror the constriction 28.

In addition to the cold working or deformation forces at the constrictions 24–34, shear forces are applied to the sheet metal 12 at the corners of the rim indentations 64–74 and shank indentations 76–86. Thus, when a torque urging the fastener 10 to rotate in a counterclockwise direction (as viewed in FIG. 5) is applied to the fastener, the corner 168 of the rim indentation 66 and the corner 222 of the shank indentation 78 apply shear forces to the sheet metal 12. Although the foregoing description has been in regard to the application of counterclockwise torque to the fastener 10, both shear and deformation forces are applied to the sheet metal 12 upon the application of clockwise torque to the fastener 10.

As a result of the combined deformation and shear forces applied to the sheet metal 12 upon the application of a torque tending to rotate the fastener 10 relative to the sheet metal, the fastener cannot be easily rotated. This feature is particularly important when there are to be repeated tightenings and loosenings of an externally threaded element into and out of the fastener 10 over the operating life of the fastener. Thus, each time an externally threaded bolt engages the internal thread 130 of the fastener and is tightened, the fastener tends to be rotated in one direction relative to the sheet metal 12 while loosening the bolt tends to rotate the fastener in the opposite direction relative to the sheet metal. During repeated tightening and loosening of an externally threaded member, the combined influence of the shear forces and cold working forces applied to the sheet metal 12 will retain the fastener 10 against movement relative to the sheet metal.

Summary

The present invention provides a new and improved fastener 10 which is held against axial and rotational movement relative to a member 12 by the interaction between the member and the fastener. The fastener 10 has a shank section 18 which extends axially outward from and is coaxial with a head section 14 of the fastener. The head section 14 includes a rim 16 which cooperates with the shank section 18 to define a groove 20 in which the material of the member 12 is received.

In order to prevent rotational movement of the fastener 10 relative to the member 12 upon the application of torque loads to the fastener, indentations 64–86 are formed in the rim 16 and shank section 18 of the fastener. These indentations have corners 166, 168, 218 and 222 which apply shear forces to the material of the member 12.

To further resist relative rotation between the member 12 and the fastener 10, side surfaces 36–46 on the shank section 18 and side surfaces 48–58 on the rim 16 of the fastener cooperate to form constrictions 24–34. Upon the application of a torque load to the fastener, the constrictions 24–34 apply deformation or cold working forces to the material of the member 12 to resist relative rotation between the fastener 10 and the member. Thus, the fastener 10 is held against rotation relative to the member 12 by the combined influence of shear forces and deformation forces.

The indentations 64–74 in the rim 16 of the fastener 10 are advantageously formed with radially and axially outwardly sloping side surfaces 98–108. The sloping side surfaces 98–108 of the indentations 64–74 promote a smooth flow of the material of the member 12 into the indentations during mounting of the fastener. This results in the member 12 having a relatively smooth surface on the side 92 opposite where the fastener is mounted on the member. Due to the smooth surface 92, the fastener 10 may advantageously be used as a drain nut in an oil pan. The smooth surface in the area where the drain nut 10 is mounted promotes the formation of a tight seal with a drain plug 124.

Having described a specific preferred embodiment of the invention, the following is claimed:

1. A fastener adapted to be received in a member and held against axial and rotational movement relative to the member by interacton between the member and said fastener, said fastener comprising a head section having a central axis, a shank section extending axially outwardly from said head section and having a central axis conincident with the central axis of said head section, said head and shank sections including surface means for defining an internal thread convolution extending axially through said head and shank sections, said head section including a rim which extends axially along said shank section, said rim of said head section and said shank section cooperating to at least partially define a generally annular groove which extends around said shank section and has a generally annular bottom surface which faces axially outwardly toward an outer end portion of said shank section, said groove being adapted to receive the material of the member upon mounting of the fastener on the member, said shank section including a plurality of axially extending indentations having inner end portions disposed adjacent to the bottom surface of the groove and outer end portions disposed in the outer end portion of said shank section, said shank section including a plurality of axially extending arcuate side surfaces disposed between the indentations in said shank section and having inner end portions disposed adjacent to the bottom surface of the groove and outer end portions disposed in the outer end portion of said shank section, said indentations and said arcuate side surfaces of said shank section cooperating to form a radially inner and axially extending side wall of the groove, said indentations in said shank section intersectioning said arcuate side surfaces of said shank section to form axially extending corners which apply shear forces to the material of the member upon application of torque loads to said fastener, each of said identations in said shank section includes an axially extending arcuate side surface which has a first radius of curvature, said rim having a flat bearing surface which is disposed in a plane extending perpendicular to the central axis of said shank section and which faces axially outwardly toward the outer end portion of said shank section and which is engageable with the material of the member, said rim including a plurality of axially extending indentations having inner end portions disposed adjacent to the bottom surface of the groove and outer end portions adjacent to said flat bearing surface, said rim including a plurality of axially extending flat side surfaces disposed between the indentations in said rim and having inner end portions disposed adjacent to the bottom surface of the groove and outer end portions disposed adjacent to said flat bearing surface, said indentations and said flat side surfaces of said rim cooperating to form a radially outer and axially extending side wall of the groove, said indentations in said rim intersecting said flat side surfaces of said rim to form axially extending corners which apply shear forces to the material of the member upon application of torque loads to said fastener, each of said indentations in said rim includes an axially extending arcuate side surface which has a second radius of curvature which is greater than said first radius of curvature, said flat side surfaces of said rim cooperating with said arcuate side surfaces of said shank section to form a constriction means for applying deformation forces to the material of the member upon application of torque loads to said fastener, said fastener and member cooperating to resist relative rotation under the combined influence of the cold working forces applied to the material of the member by said constriction means and of the shear forces applied to the material of the member by the corners of said rim and shank section.

2. A fastener as set forth in claim 1 wherein each of said indentations in said rim intersects said flat bearing surface at an arcuate edge, each of said indentations in said rim being at least partially defined by a sloping side surface which slopes radially and axially outwardly from the bottom surface of the groove to promote a smooth flow of the material of the member into the groove upon mounting of the fastener on the member.

3. A fastener as set forth in claim 2 wherein each of said indentations in said rim is at least partially defined by an arcuate side surface which extends from one of said sloping side surfaces to said bearing surface, said arcuate side surface of each of said indentations in said rim having a center of curvature which is disposed radially inwardly of a circular central axis of the generally annular groove.

4. A fastener as set forth in claim 2 wherein said sloping side surface of each of said indentations in said rim has an arcuate line of intersection with the bottom surface of the groove, said arcuate line of intersection between the bottom of the groove and said sloping surface having a center of curvature which is disposed on the central axis of said shank section.

5. A fastener adapted to be received in a member and held against axial and rotational movement relative to the member by interaction between the member and said fastener, said fastener comprising a head section having a central axis, a shank section extending axially outwardly from said head section and having a central axis coincident with the central axis of said head section, said head and shank sections including surface means for defining an internal thread convolution extending axially through said head and shank sections, said head section including a rim which extends axially along said shank section, said rim of said head section and said shank section cooperating to at least partially define a generally annular groove which extends around said shank section and has a generally annular bottom surface which faces axially outwardly toward an outer end portion of said shank section, said groove being adapted to receive the material of the member upon mounting of the fastener on the member, said shank section including a plurality of axially extending indentations having inner end portions disposed adjacent to the bottom surface of the groove and outer end portions disposed in the outer end portion of said shank section, said shank section including a plurality of axially extending arcuate side surfaces disposed between the indentations in said shank section and having inner end portions disposed adjacent to the bottom surface of the groove and outer end portions disposed in the outer end portion of said shank section, said indentations and said arcuate side surfaces of said shank section cooperating to form a radially inner and axially extending side wall of the groove, said indentations in said shank section intersecting said arcuate side surfaces of said shank section to form axially extending corners which apply shear forces to the material of the member upon application of torque loads to said fastener, said rim having a bearing surface which faces axially outwardly toward the outer end portion of said shank section and which is engageable with the material of the member, said rim including a plurality of axially extending indentations having inner end portions disposed adjacent to the bottom surface of the groove and outer end portions adjacent to said flat bearing surface, said rim including a plurality of axially extending flat side surfaces disposed between the indentations in said rim and having inner end portions disposed adjacent to the bottom surface of the groove and outer end portions disposed adjacent to said flat bearing surface, said indentations and said flat side surfaces of said rim cooperating to form a radially outer and axially extending side wall of the groove, said indentations in said rim intersecting said flat side surfaces of said rim to form axially extending corners which apply shear forces to the material of the member upon application of torque loads to said fastener, said flat side surfaces of said rim cooperating with said arcuate side surfaces of said shank section to form a plurality of constriction means disposed in an annular array along the groove for applying deformation forces to the material of the member at a plurality of locations upon application of torque loads to said fastener, each one of said plurality of constriction means tapering circumferentially along the groove from a first relatively wide end portion disposed adjacent to a first one of said indentations in said shank section and a first one of said indentations in said rim to a narrow portion formed between one of said arcuate side surfaces of said shank section and one of said flat side surfaces of said rim, each of said constriction means flaring circumferentially along the groove from the narrow portion to a second relatively wide end portion disposed adjacent to a second one of said indentations in said shank section and a second one of said indentations in said rim, said narrow portion of said one constriction means being located midway between said first and second indentations in said shank section and midway between said first and second indentations in said rim, said fastener and member cooperating to resist relative rotation under the combined influence of the cold working forces applied to the material of the member by said plurality of constriction means 6. A fastener as set forth in claim 5 wherein each of said indentations in said rim intersects said bearing surface at an arcuate edge, each of said indentations in said rim being at least partialy defined by a sloping side surface which slopes radially and axially outwardly from the bottom surface of the groove to promote a smooth flow of the material of the member into the groove upon mounting of the fastener on the member, each of said indentations in said rim being further defined by an arcuate side surface which extends from one of said sloping side surfaces to said bearing surface.

7. A fastener as set forth in claim 6 wherein said sloping side surface of each of said indentations in said rim has an arcuate line of intersection with the bottom surface of the groove, said arcuate line of intersection between the bottom of the groove and said sloping surface having a center of curvature which is disposed on the central axis of said shank section.

8. A fastener adapted to be received in a member and held against axial and rotational movement relative to the member by interaction between the member and said fastener, said fastener comprising a head section having a central axis, a shank section extending axially outwardly from said head section and having a central axis coincident with the central axis of said head section, said head and shank sections including surface means for defining an internal thread convolution extending axially through said head and shank sections, said head section including a rim whcih extends axially along said shank section, said rim of said head section and said shank section cooperating to at least partially define a generally annular groove which extends around said shank section and has a generally annular bottom surface which faces axially outwardly toward an outer end portion of said shank section, said groove being adapted to receive the material of the member upon mounting of the fastener on the member, said shank section including a plurality of axially extending indentations having inner end portions disposed adjacent to the bottom surface of the groove and outer end portions disposed in the outer end portion of said shank section, each of said indentations in said shank section includes an axially extending arcuate side surface which has a first center of curvature, said shank section including a plurality of axially extending arcuate outer side surfaes disposed between the indentations in said shank section and having inner end portions disposed adjacent to the bottom surface of the groove and outer end portions disposed in the outer end portion of said shank section, said indentations and said arcuate outer side surfaces of said shank section cooperating to form a radially inner and axially extending side wall of the groove, said indentations in said shank section intersecting said arcuate outer side surfaces of said shank section to form axially extending corners which apply shear forces to the material of the member upon application of torque loads to said fastener, said rim having a bearing surface which faces axially outwardly toward the outer end portion of said shank section and which is engageable with the material of the member, said rim including a plurality of axially extending indentations having inner end portions disposed adjacent to the bottom surface of the groove and outer end portions adjacent to said flat bearing surface, each of said indentations in said rim includes an axially extending arcuate side surface which has a second center of curvature, said first center of curvature being spaced further from the central axis of said shank section than said second center of curvature, said rim including a plurality of axially extending flat side surfaces disposed between the indentations in said rim and having inner end portions disposed adjacent to the bottom surface of the groove and outer end portions disposed adjacent to said flat bearing surface, said indentations and said flat side surfaces of said rim cooperating to form a radially outer and axially extending side wall of the groove, said indentations in said rim intersecting said flat side surfaces of said rim to form axially extending corners which apply shear forces to the material of the member upon application of torque loads to said fastener, said flat side surfaces of said rim cooperating with said arcuate outer side surfaces of said shank section to form a plurality of constriction means disposed in an annular array along the groove for applying deformation forces to the material of the member at a plurality of locations upon application of torque loads to said fastener, each one of said plurality of constriction means tapering circumferentially along the groove from a first relatively wide end portion disposed adjacent to a first one of said indentations in said shank section and a first one of said indentations in said rim to a narrow portion formed between one of said arcuate outer side surfaces of said shank section and one of said flat side surfaces of said rim, each of said constriction means flaring circumferentially along the groove from the narrow portion to a second relatively wide end portion disposed adjacent to a second one of said indentations in said shank section and a second one of said indentations in said rim, said narrow portion of said one constriction means being located midway between said first and second indentations in said shank section and midway between said first and second indentations in said rim, said fastener and member cooperating to resist relative rotation under the combined influence of the cold working forces applied to the material of the member by said plurality of constriction means and of the shear forces applied to the material of the member by the corners of said rim and shank section.

9. A fastener as set forth in claim 8 wherein each of said indentations in said rim intersects said bearing surface at an arcuate edge, each of said indentations in said rim being at least partially defined by a sloping side surface which slopes radially and axially outwardly from the bottom surface of the groove to promote smooth flow of the material of the member into the groove upon mounting of the fastener on the member, each of said indentations in said rim being further defined by an arcuate side surface which extends from one of said sloping side surfaces to said bearing surface.

10. A fastener as set forth in claim 9 wherein said sloping side surface of each of said indentations in said rim has an arcuate line of intersection with the bottom surface of the groove, said arcuate line of intersection between the bottom of the groove and said sloping having a centrer of curvature which is disposed on the central axis of said shank section.

* * * * *

UNITED STATES PATENT AND TRADEMARK OFFICE
CERTIFICATE OF CORRECTION

PATENT NO. : 4,708,556
DATED : November 24, 1987
INVENTOR(S) : W. Richard Pamer; James A. Zils It is certified that error appears in the above-identified patent and that said Letters Patent are hereby corrected as shown below:

Column 11, line 5, after "means" insert -- and of the shear forces applied to the material of the member by the corners of said rim and shank section. --.

Signed and Sealed this

Nineteenth Day of April, 1988

Attest:

DONALD J. QUIGG

*Attesting Officer*  *Commissioner of Patents and Trademarks*